F. RUDOLPHI.
CAN BODY MAKING MACHINE.
APPLICATION FILED SEPT. 30, 1905.
956,179.
Patented Apr. 26, 1910.
7 SHEETS—SHEET 3.
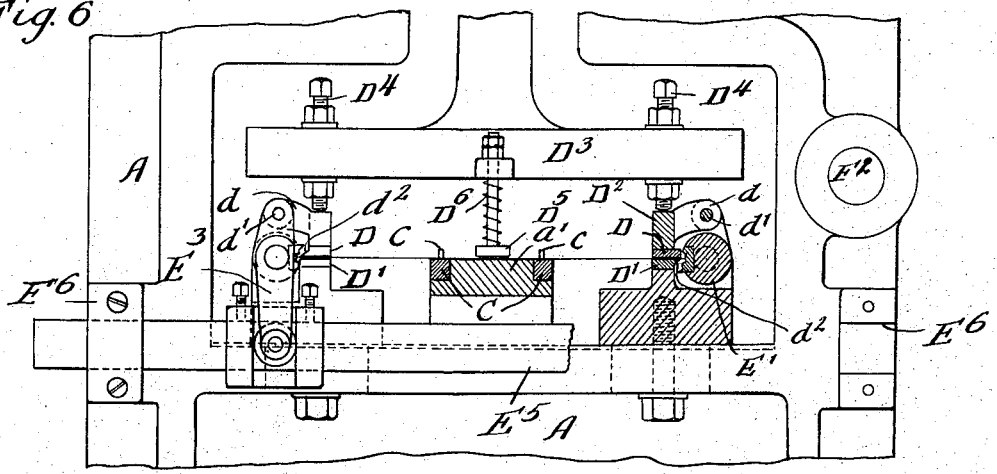
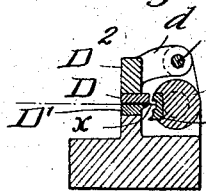
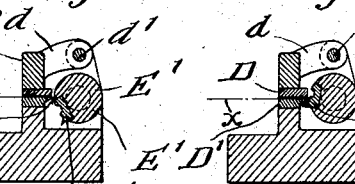
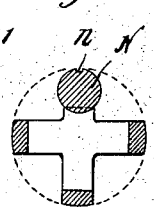
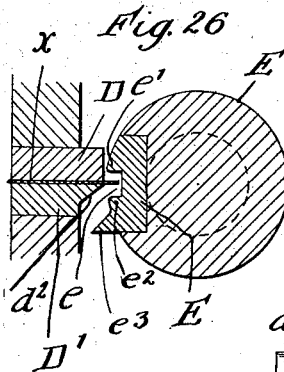
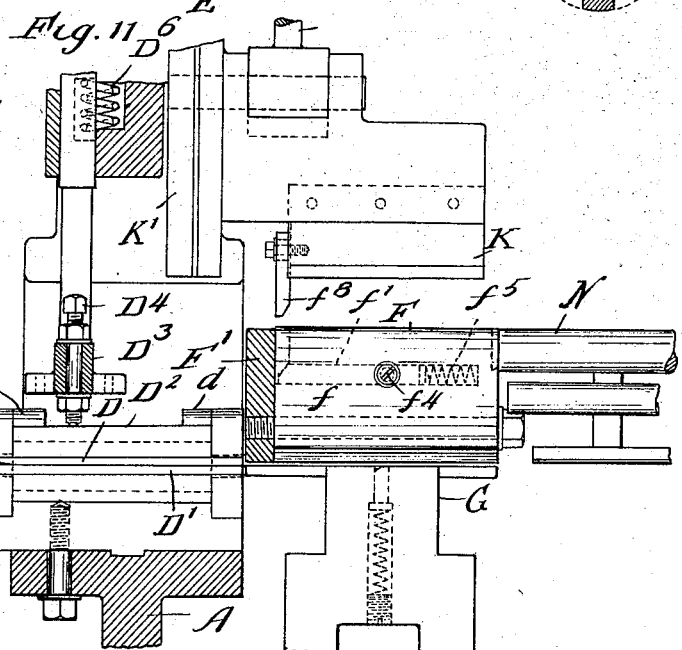
Witnesses:
Wm. Geiger
Pearl Abrams
Inventor
Frank Rudolphi
By Munday, Evarts & Adcock
Attorneys F. RUDOLPHI.
CAN BODY MAKING MACHINE.
APPLICATION FILED SEPT. 30, 1905.
956,179.
Patented Apr. 26, 1910.
7 SHEETS—SHEET 4.
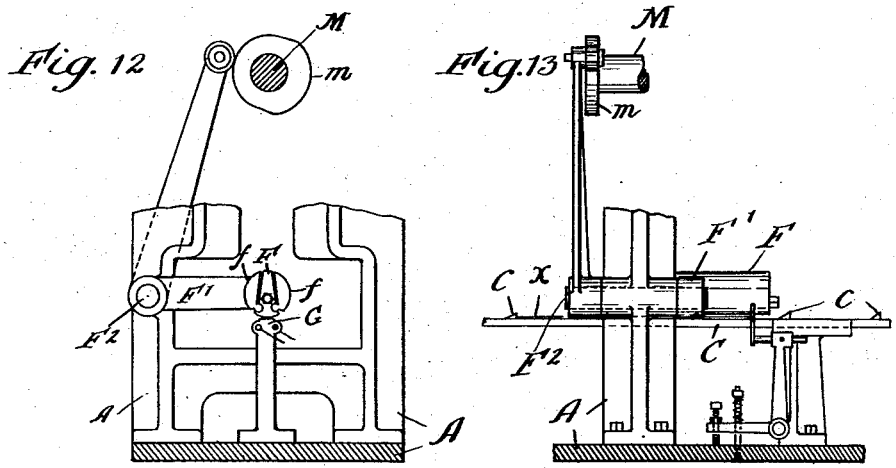
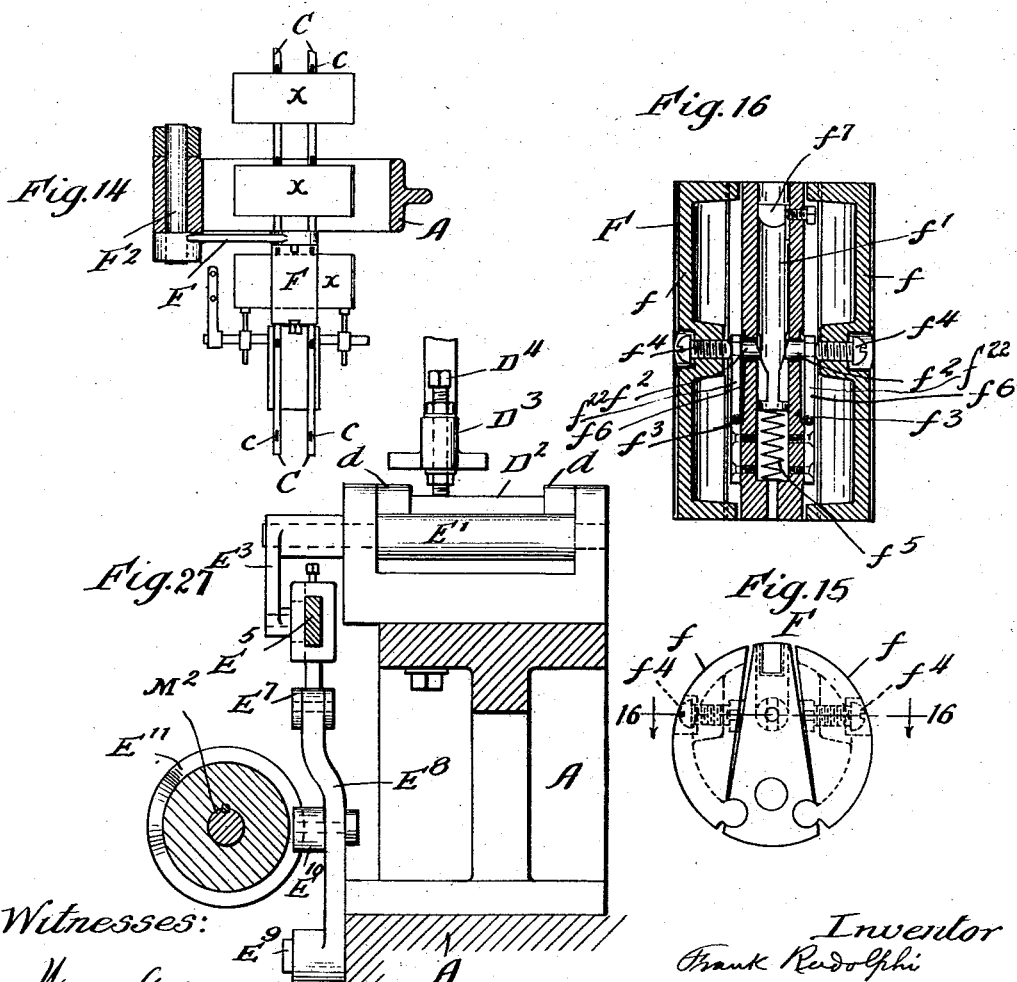
Witnesses:
Wm. Geiger
Pearl L. Abrams
Inventor
Frank Rudolphi
By Munday, Evarts & Adcock
Attorneys F. RUDOLPHI.
CAN BODY MAKING MACHINE.
APPLICATION FILED SEPT. 30, 1905.
956,179.
Patented Apr. 26, 1910.
7 SHEETS—SHEET 5.
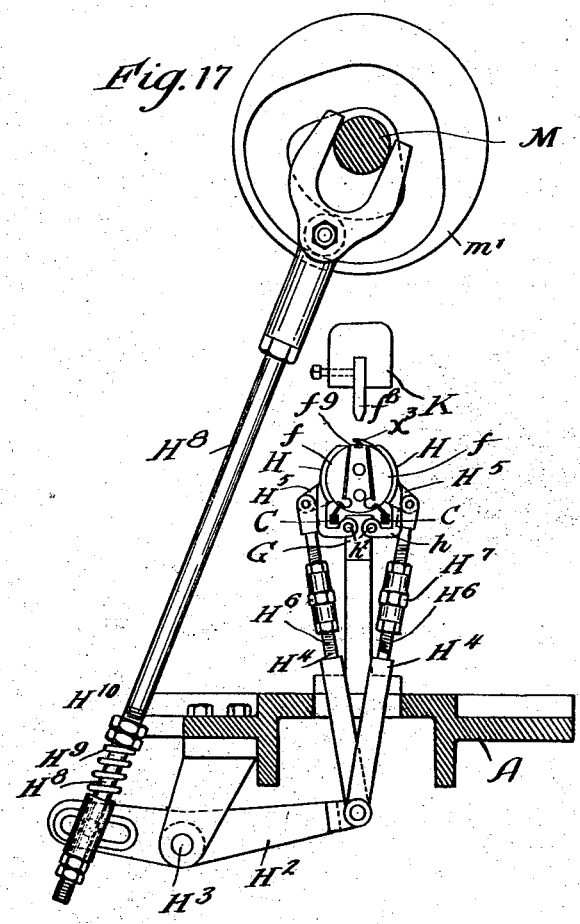
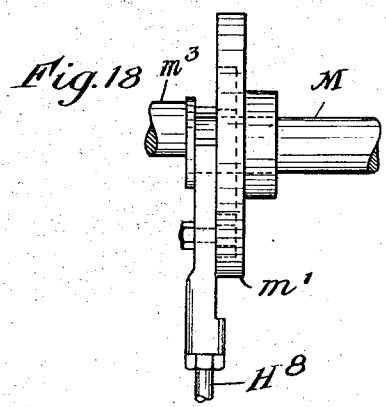
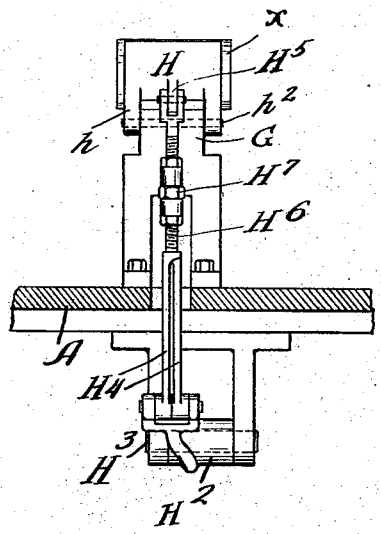
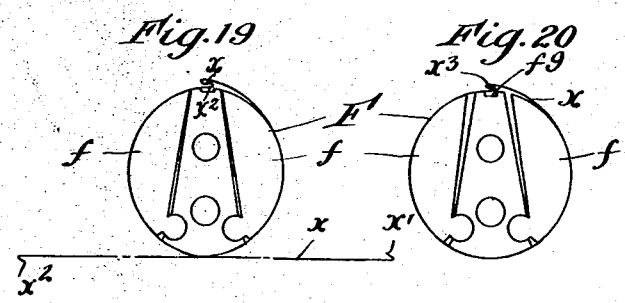
Witnesses:
Wm. Geiger
Pearl Abrams
Inventor
Frank Rudolphi
By Munday, Evarts & Adcock
Attorneys F. RUDOLPHI.
CAN BODY MAKING MACHINE.
APPLICATION FILED SEPT. 30, 1905.
956,179.
Patented Apr. 26, 1910.
7 SHEETS—SHEET 6.
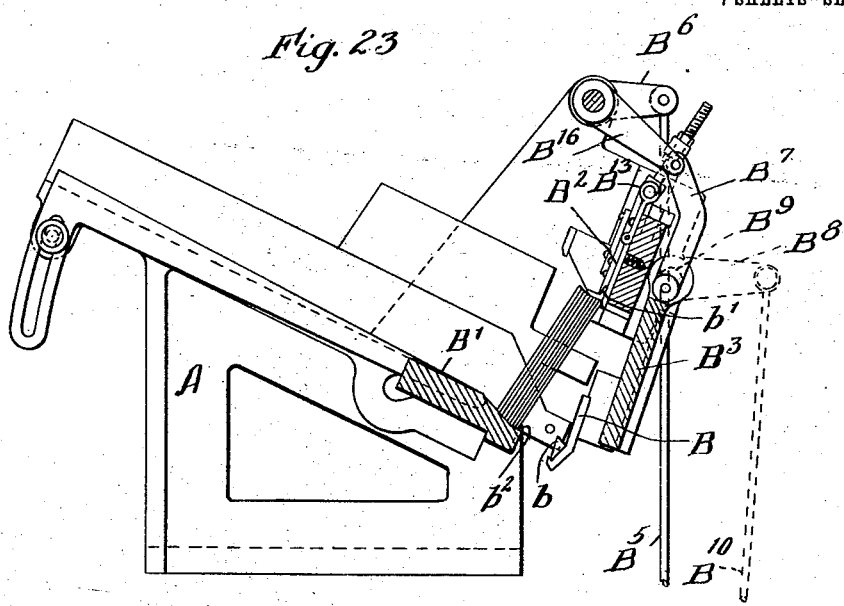
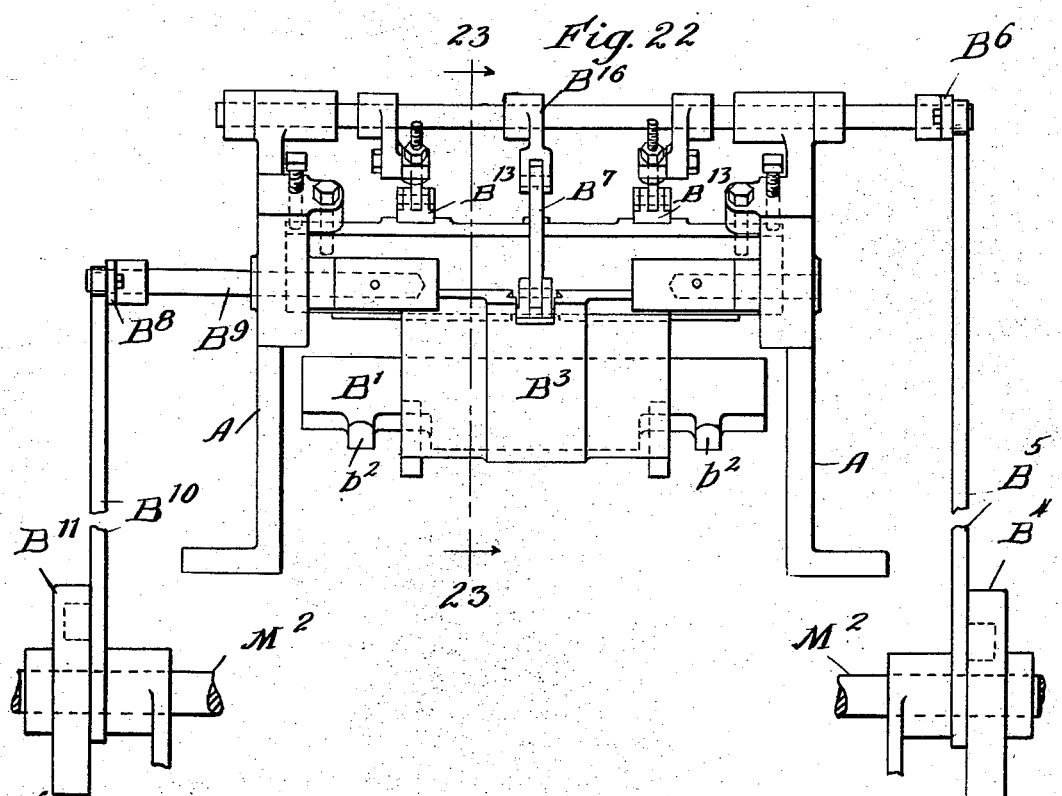
Witnesses:
Wm Geiger
Pearl Abrams
Inventor
Frank Rudolphi
By Munday, Evarts & Adcock
Attorneys

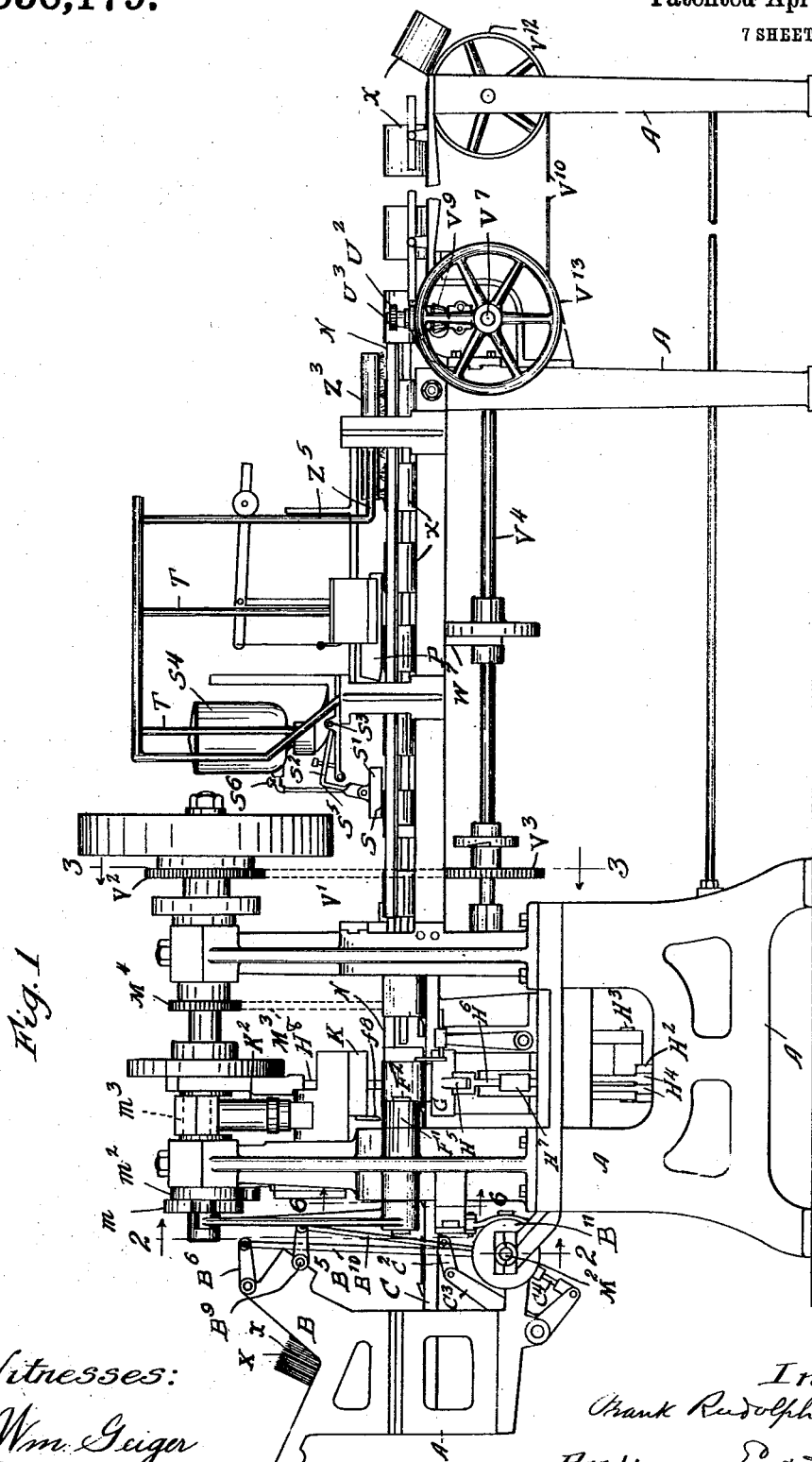

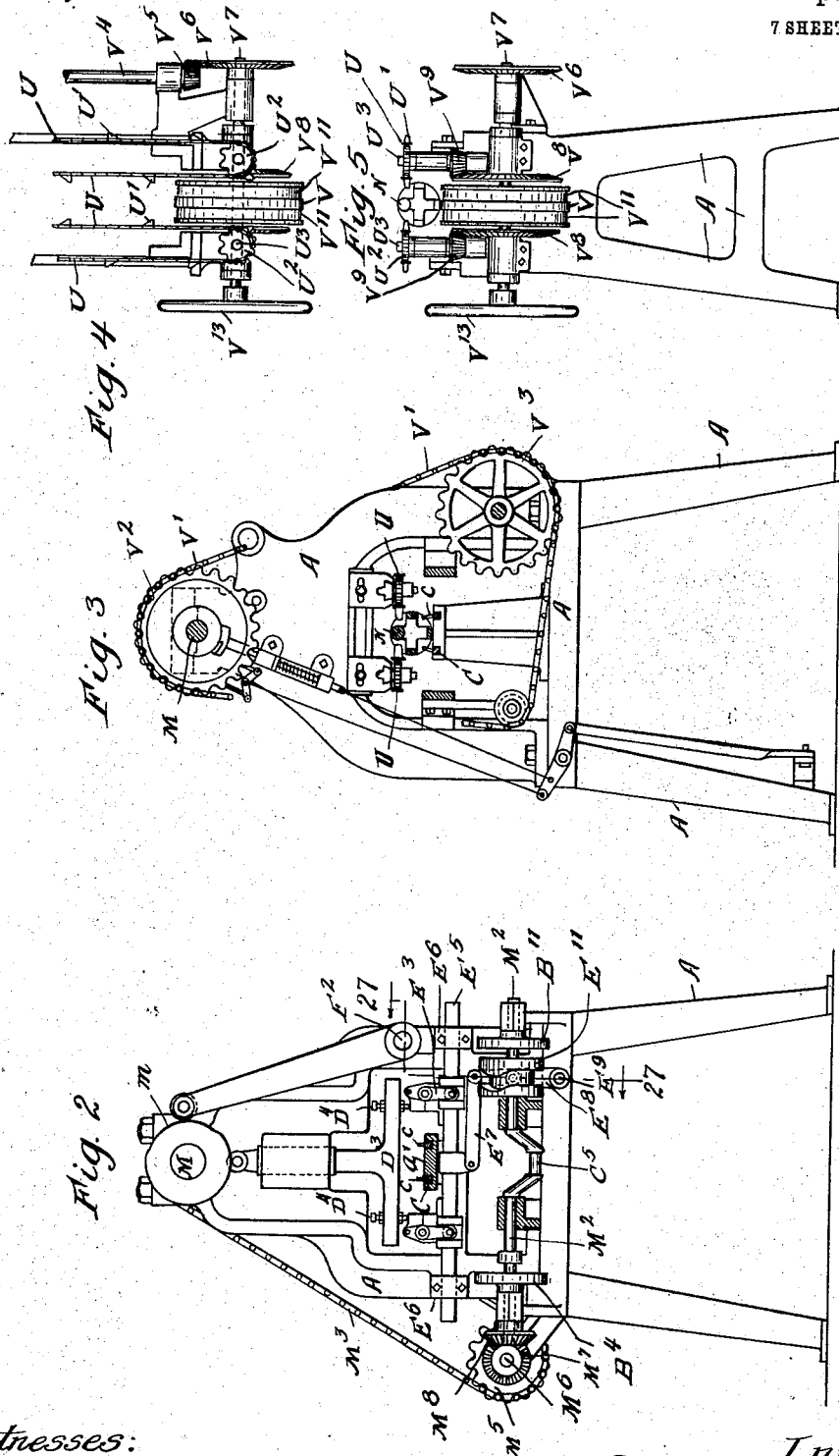

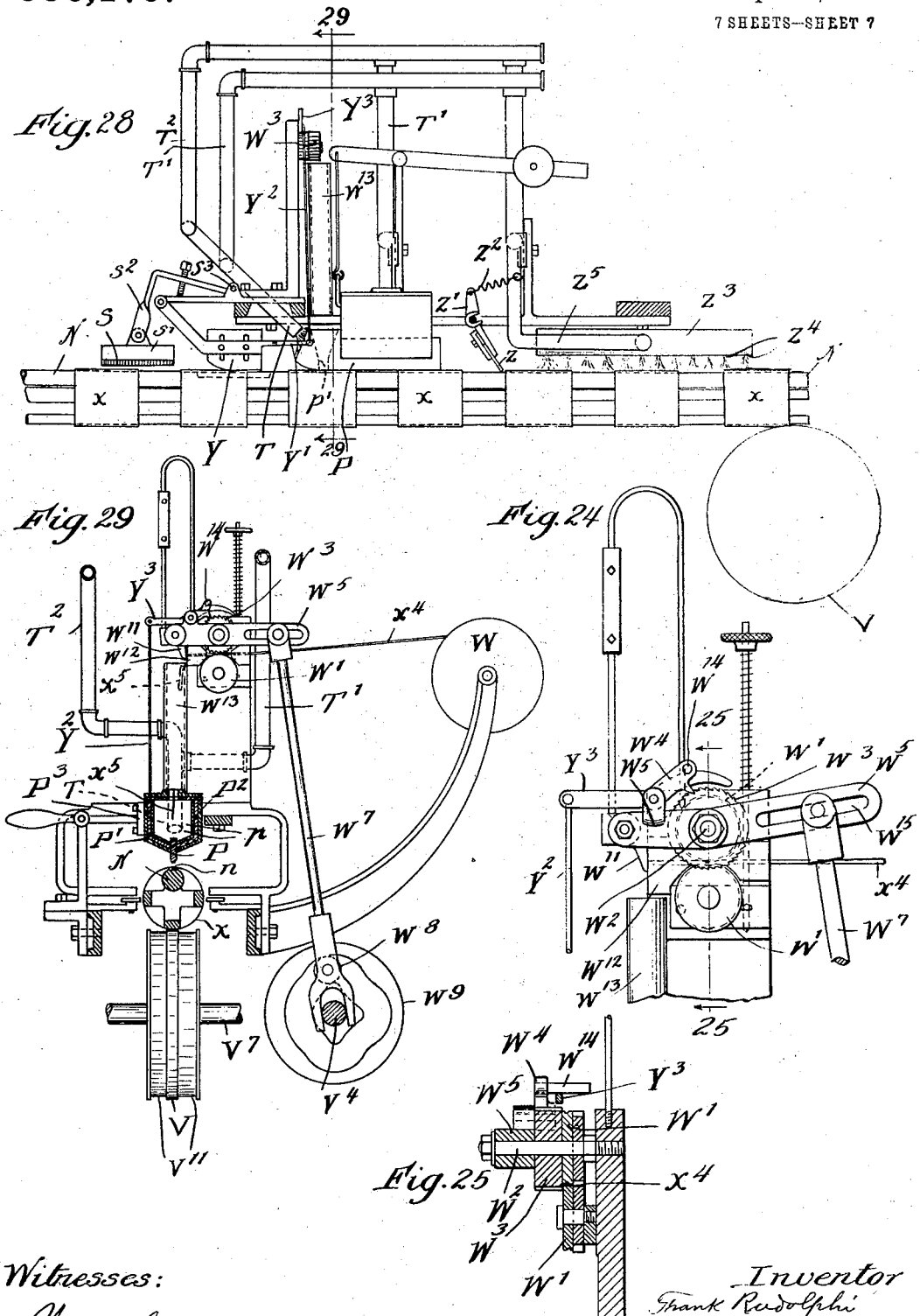

UNITED STATES PATENT OFFICE.

FRANK RUDOLPHI, OF CHICAGO, ILLINOIS, ASSIGNOR TO AMERICAN CAN COMPANY, OF NEW YORK, N. Y., A CORPORATION OF NEW JERSEY.

CAN-BODY-MAKING MACHINE.

956,179.          Specification of Letters Patent.        Patented Apr. 26, 1910.

Application filed September 30, 1905. Serial No. 280,730.

*To all whom it may concern:*

Be it known that I, FRANK RUDOLPHI, a citizen of the United States, residing in Chicago, in the county of Cook and State of Illinois, have invented a new and useful Improvement in Can-Body-Making Machines, of which the following is a specification.

My invention relates to improvements in can body making machines.

The object of my invention is to provide a can body making machine of a simple, efficient and durable construction, by means of which can bodies may be automatically, rapidly, cheaply and perfectly manufactured, and the can bodies produced of uniform size or diameter, and by means of which also the soldering of the side seams may be done with a minimum amount of solder, and without smearing or coating either the interior or exterior surface of the can body with solder on either side of its lock seam.

My invention consists in the means I employ to practically accomplish this important object or result, as shown in the accompanying drawing forming a part of this specification, and herein described and specified in the claims.

In said drawing, Figure 1 is a side elevation of an automatic can body making machine embodying my invention. Figs. 2 and 3 are vertical sections on lines 2—2 and 3—3 respectively of Fig. 1. Fig. 4 is a partial detail plan view. Fig. 5 is a rear end view. Fig. 6 is a detail vertical section on line 6—6 of Fig. 1. Figs. 7, 8 and 9 are detail sections through one of the edge folding or hook forming devices, showing the parts in different positions. Fig. 10 is a detail cross section of the soldering horn. Fig. 11 is a detail, central, vertical, longitudinal section partly in elevation showing the body former horn and other adjacent parts. Fig. 12 is a detail elevation showing the mechanism for moving the can body former horn up and down. Fig. 13 is a detail side view of the body former horn and certain adjacent parts. Fig. 14 is a plan view partly in horizontal section showing the can body blank feed mechanism and the body former horn. Fig. 15 is a detail end view of the body former horn. Fig. 16 is a section of the body former horn on line 16—16 of Fig. 15. Fig. 17 is a detail view partly in vertical section showing the wings or folders for wrapping the blank around the body former horn. Fig. 18 is an elevation partly in vertical section of the part shown in Fig. 17. Figs. 19 and 20 are end views of the horn showing the blank in different stages or positions around the horn. Fig. 21 is an end view of the finished can body. Fig. 22 is a detail elevation of the can body blank feeder. Fig. 23 is a section on line 23—23 of Fig. 22. Fig. 24 is an enlarged detail elevation of the wire solder feed device. Fig. 25 is a section on line 25—25 of Fig. 24. Fig. 26 is an enlarged detail sectional view showing one of the edge folding or hook forming devices and the clamps for the end of the blank. Fig. 27 is a vertical cross section on line 27—27 of Fig. 2; Fig. 28 is a detail elevation of the soldering mechanism, and Fig. 29 is a section on line 29—29 of Fig. 28.

The can body making machine embodying my invention, and shown in said drawing, comprises in coöperative combination a can body blank feeder for automatically feeding the blanks one by one from the stack or pile, a blank conveyer, two pair of clamps, one clamp of each pair being provided with an edge folding or hook forming lip, a pair of rotary or rocking hook formers or edge folders operating in conjunction with said clamps to form the reversely turned hooks or edge folds on the opposite ends of the blank by the downward and upward rocking movements of said rotary or rocking hook formers, an expansible or collapsible body former horn having an upward and downward movement to permit the blank to be conveyed under the horn, a stationary or rigid anvil or support for the up and down movable and expansible horn, a reciprocating bumper for closing the interlocked hooks or edge folds into a seam against the horn, a wedge or cam carried by the reciprocating bumper or its slide for operating or expanding the horn, a pair of wings or folders for bending or forming the blank around the horn, a soldering horn connected to the end of the body former horn, a flux or acid applying device for fluxing the seam, a soldering iron coöperating with the soldering horn to solder the side seam of the can body as it is moved along between the soldering iron below and the soldering horn above, a wire solder feed device and mechanism for operating or controlling the operation of the same by the movement of the can body along the horn so that the solder will be fed if a can body is present to receive the solder, but not fed if no can body is so present, and mechanism for moving the can body from the body former horn along the soldering horn and discharging the same from the machine, and means for operating or imparting to the several coöperative moving devices or parts of the machine their required movements.

My invention also consists in the novel construction of parts and devices and in the novel combinations of parts and devices herein shown or described, and more particularly specified in the claims.

In the drawing, A represents the frame of the machine.

B represents the blank feeder or device for feeding the flat can body blanks $x$ one by one automatically from the stack or pile X of blanks in the holder $B^1$ of the feeder.

C is the blank conveyer by means of which the flat can body blanks are conveyed or moved forward, first to the edge folding or hook forming devices, and then to the body former horn. The blank conveyer C preferably comprises a pair of reciprocating slides, sliding on suitable guides $a^1$ on the frame of the machine.

D $D^1$ and D $D^1$ are two pair of clamps adapted to grasp the can body blank $x$ near its ends and hold the same firmly, while the rotary or rocking edge folders or hook formers E form the oppositely turned edge folds or hooks $x^1$ $x^2$ on the opposite ends of the blank $x$. The lower clamp $D^1$ of each pair is mounted on the stationary frame of the machine, and the upper clamp D of each pair is preferably the movable member and is adapted to be moved or pressed downward so as to properly clamp the can body blank. Each movable clamp D is preferably secured to a movable bar $D^2$, having arms or lugs $d$ pivotally connected at $d^1$ to the stationary frame of the machine so as to admit of the necessary slight movement being imparted to the movable clamp. One clamp of each pair is provided with a hook forming lip $d^2$ over which the hook or edge fold is formed or bent, the hook forming lip $d^2$ being on the upper clamp D to form the upturned hook $x^1$, and on the lower clamp $D^1$ at the opposite end to form the downturned hook or edge fold $x^2$. Each of the two rotary or rocking hook formers or edge folders E is secured to a rocking holder $E^1$, by or through which the necessary rotary or rocking movement is imparted to it. The two rocking hook formers E are alike and are reversely mounted or disposed so that one will form an upturned hook and the other a downturned hook. Each of these rocking hook formers is furnished with a longitudinal recess or groove $e$ to receive the projecting end of the blank $x$, and serve as a guide therefor in adjusting the position of the blank between the two hook formers. Each of the hook formers E is also provided with a projecting shoulder or bead $e^1$ which engages the projecting end of the blank and bends it at right angles to the plane of the blank, as illustrated, for example, in Fig. 8, when the hook former is rocked in one direction, and also with a shoulder or bead $e^2$ and projecting lip $e^3$ which serve, when the hook former is rocked in the opposite direction, to complete the formation of the hook $x^1$ or $x^2$ over the forming lip $d^2$ of the clamp D or $D^1$. After the formation of the hook is thus completed, the hook former E returns to its central or normal position.

The upper or movable clamps D rest normally with their own weight and with that of their bars or holders $D^2$ on the blanks $x$ as they are fed or conveyed forward beneath the same by the blank conveyer C, and serve not only to straighten, smooth and flatten the blanks, but also to prevent danger of the blanks being overcarried by the conveyer in its quick or rapid reciprocating movement, thus insuring the blanks being always properly presented to the edge folders and to the horn. The upper or movable clamps D D are given their necessary slight downward movement to cause them to firmly grip the blanks against the lower clamps $D^1$ $D^1$ by means of a movable presser foot $D^3$, which is furnished with adjusting screws $D^4$ to engage the clamp bars or holders $D^2$. To further insure the blanks $x$ being maintained in a straight flat position, the presser foot $D^3$ is provided with a clamp bar $D^5$ which engages the blank at its middle, and which is furnished with a spring $D^6$ to force the same yieldingly against the blank. The guide $a^1$ on the frame of the machine opposes the spring clamp bar $D^5$. The blank conveyer or carrier C is provided with two pair of pawls $c$ so that at each movement of this conveyer one blank is moved forward to the hook formers E E, and the next preceding blank is moved forward from the formers E to the horn F and the anvil block or support G. The body former horn F is expansible and collapsible or provided with movable segments or wings $f$ hinged to the main portion of the horn, and adapted to be expanded after the hooks or edge folds $x^1$ $x^2$ are carried past each other, as illustrated in Fig. 19, so as to interlock or draw the hooks together, as illustrated in Fig. 20, before the seam is bumped, as illustrated in Fig. 21. The wings or clamps $f$ $f$ of the horn are thus expanded or spread apart by means of a wedge $f^1$ mounted to reciprocate in the main portion of the horn, and which engage wedge blocks $f^2$ $f^2$ on arms $f^{22}$ hinged to the horn at $f^3$, and which bear against adjusting screws $f^4$ on the movable wings or segments $f$ of the horn. A spring $f^5$ returns the wedge to position, and flat springs $f^6$ serve to retract the wings of the horn. The wedge $f^1$ is provided with an inclined face $f^7$ so that it may be operated by a wedge finger or projection $f^8$ carried by the bumper K by which the interlocked hooks or edge folds $x^1$ $x^2$ are compressed together and into the longitudinal groove $f^9$ in the upper side of the horn, thus forming the lock seam $x^3$ which is thus caused to project on the inner surface of the can body $X^2$.

The horn F is an up and down movable horn, the same having a slight upward movement to lift it slightly off the anvil or block G in order to permit the can body blank $x$ to be fed or slipped under the horn and between it and the anvil or support G upon which the horn normally rests, and which firmly supports it against the thrust or blow of the bumping hammer K in bumping or closing the seam. This slight up and down movement of the horn also causes the blank $x$ to be firmly clamped at its middle portion between the anvil or block G and the horn while the blank is being folded or formed around the horn by the can body folders or formers H H, thus insuring the proper registry of the two ends of the blank and the hooks or edge folds thereon together, and preventing the can body being formed irregularly or askew, and insuring regularity, uniformity and perfection in the formed can bodies, while permitting the work to be done very rapidly. To give the necessary slight up and down movement to the horn F, I mount it on a bent lever $F^1$ pivoted to the frame at $F^2$ and operated by a cam $m$ on the cam shaft M.

The body formers, folders or wings H H are segmental in form and conform to the surface of the horn, each being somewhat less than a semi-circle in extent. Each of these body former wings or folders H is provided with a hinged arm $h$ by which it is hinged at $h^2$ to the anvil block G or other stationary portion of the machine. These winged folders H are opened and closed around the horn by means of a vibrating lever $H^2$, pivoted to the frame at $H^3$ and connected by pivoted links $H^4$ to arms or lugs $H^5$ on the body former wings or folders H. Each of the links $H^4$ is furnished with an adjustable member $H^6$ and an adjusting screw or turn buckle $H^7$ to properly adjust the movement of the body former wings or folders H. These links are so adjusted that one of the wings or folders H closes slightly before the other, so as to cause the outer hook or edge fold $x^1$ to overlap the inner hook or edge fold $x^2$. The lever $H^2$ is operated by a cam $m^1$ on the cam shaft M through a connecting link $H^8$, which is furnished with a spring $H^9$ and an adjustable nut $H^{10}$ so as to impart a yielding movement to the body former wings or folders H.

The bumper K is given an up and down reciprocating movement to cause the same to bump or compress the folds of the seam together through a reciprocating slide or cross head $K^1$ operated by an eccentric $M^3$ on the cam shaft M through the connecting link $K^2$. After the seam has been bumped, the can body is discharged from the can body former horn F and pushed on to the soldering horn N, the end of which is connected directly to the end of the body former horn, by means of a third pair of can body discharge fingers or pawls $c^1$ $c^1$ on the reciprocating can body blank conveyer C. The soldering horn N is preferably of skeleton form, as illustrated in Fig. 10, its upper or soldering member having a longitudinal groove $n$ therein to receive the lock side seam, and rub against the same as the can body is moved along this soldering horn under the soldering iron P which rests and rubs against the seam on the upper or outside thereof. The rubbing action of the seam against the soldering iron above and against the soldering horn below the seam and between which the seam is slid, causes the solder to be thoroughly sweated into the seam and through the folds thereof without unnecessarily smearing the surface of the can body adjacent to the seam with solder either on the outside or on the inside of the can body. The soldering iron P is preferably about a foot or more in length so as to give the requisite rubbing or sweating action against the outside of the seam as the can body is moved along by the soldering conveyer U under the soldering iron.

S is the aciding or fluxing device by which the acid or other flux is applied to the lock side seam of the can body before it passes along the soldering iron. This fluxing device S preferably consists of a rubbing device of absorbent material, secured to a holder or bar $S^1$, pivotally connected to an arm $S^2$, which is hinged to the frame at $S^3$. The acid or flux is contained in a tank $S^4$, and is fed drop by drop upon the fluxing device through a pipe or nozzle $S^5$ which is furnished with an adjusting valve $S^6$ to regulate the flow.

The soldering iron or shoe P is preferably furnished near its front end with a solder cup, cavity or hopper $p$, having a small opening $p^1$ at its bottom through which the molten solder may flow onto the seam of the can as it passes underneath the soldering iron. The groove $n$ in the soldering horn beneath the seam catches or collects any solder which may sweat through the seam onto the inside of the can. T are the heaters preferably gas burners for projecting flame against the soldering iron and soldering horn, and for melting and keeping melted the solder and heating the seam during the soldering operation. The soldering iron is preferably furnished with a flame confining chamber or shell $P^1$ partially surrounding the same for directing and confining the flame of the gas burners or heaters against the soldering iron. The soldering iron and its flame confining chamber are preferably furnished with a heat confining jacket $P^2$. The soldering iron may preferably be connected to the shells $P^1$ $P^1$, which thus serve as a frame or mounting for the soldering iron. The soldering iron and its shells or chambers preferably rest with their own weight directly upon the cans or the seams of the cans as they are moved along under the soldering iron. When no can bodies are under the soldering iron, the soldering iron may rest or be supported on the soldering horn itself. Stationary guides $P^3$ surrounding the soldering horn or its connected shells confine the same in position on the soldering horn.

U is a continuously moving can body conveyer for moving the can bodies along the soldering horn, first under the fluxing device S, and then under the soldering horn and for finally discharging the can bodies from the machine over the end of the soldering horn. This continuously moving can body conveyer U preferably consists of a pair of endless chains furnished with can body pusher arms or fingers $U^1$ and traveling upon pulleys or sprocket wheels $U^2$ on the upright shafts $U^2$ $U^2$. The outer end of the soldering horn rests upon a revolving pulley or rotary support V so as to permit the can bodies to be readily discharged from the free end of the soldering horn. The soldering horn supporting pulley or wheel V is preferably positively driven, and this I prefer to do by means of a chain $V^1$ and driving pulley $V^2$ on the shaft M, pulley $V^3$ on longitudinal shaft $V^4$ having bevel gears $V^5$ meshing with bevel gears $V^6$ on the transverse shaft $V^7$. The shaft $V^7$ is furnished with bevel gears $V^8$ which mesh with bevel gears $V^9$ on the driving shaft $U^3$ of the can body conveyer chains U, thus communicating motion to the soldering conveyer U.

W is the spool or reel for the wire solder $x^4$ which is fed to the machine by a pair of wire solder feed wheels $W^1$, the shaft $W^2$ of one of which is furnished with a ratchet wheel $W^3$ actuated by a pawl $W^4$ on a pawl lever $W^5$ pivoted at $W^2$ to the frame of the machine. This pawl lever $W^5$ is operated or vibrated as required to feed forward the requisite length of wire solder for soldering each can by means of a link $W^7$, having a roller $W^8$ which engages a cam $W^9$ on the shaft $V^4$. The vibrating pawl lever $W^5$ also carries a knife $W^{11}$, which, coöperating with the solder wire guide $W^{12}$ cuts off the required amount of solder from the solder wire for soldering each can at each stroke of the pawl lever, so that the cut length $x^5$ of solder may drop through the guide or tube $W^{13}$ into the solder cup or funnel $p$ on or in advance of the soldering iron P where it is melted by the heat of the soldering iron or of the flame projected against the same, and caused to fall down upon the lock side seam $x^3$ of the can body $X^1$. To prevent the forward feed of the solder wire except when a can body is being advanced along the soldering horn ready to receive the solder, I provide a wire solder feed trip device Y which is operated by engagement with the can body itself as it is advanced along the soldering horn, so that the operation of the wire solder feed is controlled by the can body itself, thus causing no solder wire feed to take place unless there is a can body present on the soldering horn to receive the solder thus fed for it. This wire solder feed trip device Y preferably consists of a movable shoe, normally resting in the groove $n$ of the soldering horn, and adapted to be rested or lifted up by the passage of the can body under it along the soldering horn, and through which by suitable connecting mechanism, motion is communicated to the pawl $W^4$ on the pawl lever $W^5$, and thereby moves the pawl into position for engagement with the ratchet wheel $W^3$ of the solder wire feed roller, and thus causes the ratchet wheel of the solder wire feed roller only to be turned by the stroke of the pawl lever $W^5$ when the trip device Y has been operated by engagement with an advancing can body. The solder wire feed trip device Y has an operating lever $Y^1$ connected by a link $Y^2$ with a lever $Y^3$ which engages a pin $W^{14}$ on the pawl $W^5$, this being a convenient connecting mechanism for communicating motion from the trip device Y to the pawl lever. The pawl lever $W^5$ has a slot $W^{15}$ for connection with its cam operated link $W^7$ so that the stroke of the pawl lever and the consequent feed of the solder wire may be adjusted or regulated as desired. This enables the machine to adjust the solder wire feed to the size or length of the can bodies being soldered, as varying amounts of solder are necessary for different kinds of work or different kinds of cans.

Z is a wiper for removing surplus solder from the outside of the seam, the same being preferably mounted on a lever $Z^1$ furnished with a spring $Z^2$ for compressing the wiper against the can bodies as they are moved along the soldering horn.

$Z^3$ is a seam cooling device to cool the freshly soldered seam, and cause the solder therein to quickly set. This cooling device preferably consists of a compressed air pipe, furnished with a series of nozzles or openings $Z^4$ through which compressed air or other cooling fluid may be jetted or projected against the seam.

$Z^5$ are supply pipes for supplying compressed air to the seam cooling device and $T^1$ are gas supply pipes and $T^2$ air supply pipes for supplying gas and air to the heaters or burners T by which the soldering horn, soldering iron and seams of the cans are heated as required for soldering the seams.

The can body blank feeder B and its blank holder $B^1$ are preferably constructed substantially as shown and described in the Leavitt & Hodgson Patent No. 522,261 of July 3, 1894, that is to say, the feeder B has a shoulder $b$ which projects from the inner face of the feeder about the thickness of one of the blanks $x$ so as to engage the lowermost blank only of the pile and shift or slip it upward into the slot $b^1$ of the feeder safe guard or separator $B^2$ of the feeder, and thus disengage the blank from the lip $b^2$ of the holder blank $B^1$. The feeder B itself has two movements, one a sliding or reciprocating movement to slip the disengaged blank into the slot $b^1$ of the separator $B^2$ and disengage the lower edge of the blank from the lip $b^2$ of the holder $B^1$, and the other movement being a swinging or lateral one to permit the blank to drop down upon the blank conveyer or carrier C. To provide for this double movement of the feeder B, it is mounted to slide in a pivoted or swinging guide $B^3$.

The required sliding or reciprocating movement is imparted to the feeder by a cam $B^4$, on shaft $M^2$ connecting link $B^5$, levers $B^6$ and $B^{16}$ and connecting link $B^7$. The required pivotal or swinging movement is communicated to the feeder B or its guide $B^3$ by means of an arm $B^8$ rock shaft $B^9$, link $B^{10}$, and cam $B^{11}$ on shaft $M^2$.

$B^{13}$ is an extractor which serves to push the blank $x$ out of the slot $b^1$ of the separator $B^2$, in case the blank should tend to stick therein.

As the blanks are fed or delivered one by one from the holder $B^1$ by the feeder B, they fall upon or over the reciprocating conveyer or carrier bar C, by which the blanks are conveyed or carried forward to the edge folding or hook forming devices E and clamps D. The presser foot $D^3$ by which the upper or movable clamps D D are caused to firmly clamp the blank against the lower clamps $D^1$ $D^1$ is operated by a cam $m^2$ on the cam shaft M, the presser foot operating arm or slide $D^3$ having a spring $D^6$ to move it in the opposite direction. The can body blank conveyer C is reciprocated as required to feed the blanks forward, first to the edge folders or hook formers E and then to the horn by means of a link $C^2$, lever $C^3$, link $C^4$ and crank $C^5$ on the shaft $M^2$. The edge folders or hook formers E are rocked as required to form the hooks or edge folds by means of arms or levers $E^3$ on the hook formers E, connecting bar $E^5$ reciprocating in guides $E^6$, link $E^7$ connected to a lever $E^8$, pivoted to the frame at $E^9$ and having a roller $E^{10}$ engaging the cam $E^{11}$ on the shaft $M^2$. After leaving the end of the soldering horn the can bodies are delivered upon a discharge conveyer $V^{10}$, preferably consisting of a pair of endless belts, traveling on the pulleys $V^{11}$ and $V^{12}$, and by which the can bodies are discharged from the machine. The transverse shaft $V^7$ has a hand wheel $V^{13}$, soldering conveyers U to be moved by hand and the can bodies in the machine discharged by hand in case the machine becomes accidentally stopped or clogged.

Motion is communicated from the driving shaft M to the cam shaft $M^2$ by means of a sprocket chain $M^3$ traveling on sprocket wheels $M^4$ $M^5$, the latter being on shaft $M^6$, and the shaft $M^6$ having a bevel gear $M^7$ meshing with a bevel gear $M^8$ on said shaft $M^2$.

I claim:—

1. In a can body making machine, the combination with a can body blank feeder for automatically feeding the blanks one by one from a stack or pile, of a reciprocating can body blank conveyer furnished with pawls for feeding the blanks forward first to the edge folding mechanism and then to the body former horn, and with pawls for extracting the formed can body from said horn, two pair of can body blank holding clamps, one clamp of each pair being provided with an edge folding or hook forming lip, a pair of rocking hook formers or edge folders operating in conjunction with said clamps to form reversely turned hooks or edge folds on the opposite ends of the blank by the downward and upward rocking movement of said edge folders or hook formers, an expansible and collapsible body former horn having a bodily reciprocating movement to permit the blank to be conveyed under the horn and to clamp the blank at its middle portion, a pair of wings or folders for bending or forming the blank into a can body around the horn, a reciprocating bumper for closing the seam against the horn, a stationary rigid anvil or support beneath the horn to resist the blow or thrust of the bumper, a reciprocating wedge for expanding the wings or segments of the collapsible and expansible horn, a wedge finger or cam carried by the bumper for operating said horn expanding wedge, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, a wiper for removing surplus solder from the outside of the can body, a cooling device to cause the solder to quickly set, and a rotary support for the outer ends of the soldering horn, and mechanism for operating or imparting to the several coöperative moving parts or devices of the machine their required movements, substantially as specified.

2. In a can body making machine, the combination with a reciprocating can body blank conveyer furnished with pawls for feeding the blanks forward first to the edge folding mechanism and then to the body former horn, and with pawls for extracting the formed can body from said horn, two pair of can body blank holding clamps, one clamp of each pair being provided with an edge folding or hook forming lip, a pair of rocking hook formers or edge folders operating in conjunction with said clamps to form reversely turned hooks or edge folds on the opposite ends of the blank by the downward and upward rocking movement of said edge folders or hook formers, an expansible and collapsible body former horn having a bodily reciprocating movement to permit the blank to be conveyed under the horn and to clamp the blank at its middle portion, a pair of wings or folders for bending or forming the blank into a can body around the horn, a reciprocating bumper for closing the seam against the horn, a stationary rigid anvil or support beneath the horn to resist the blow or thrust of the bumper, a reciprocating wedge for expanding the wings or segments of the collapsible and expansible horn, a wedge finger or cam carried by the bumper for operating said horn expanding wedge, a soldering horn connected to the end of the body former horn, a flux or acid applying device for fluxing the seam, a soldering iron above the soldering horn coöperating therewith to solder the side seam of the can body as it is moved along the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, substantially as specified.

3. In a can body making machine, the combination with a reciprocating can body blank conveyer furnished with pawls for feeding the blanks forward first to the edge folding mechanism and then to the body former horn, and with pawls for extracting the formed can body from said horn, two pair of can body blank holding clamps, one clamp of each pair being provided with an edge folding or hook forming lip, a pair of rocking hook formers or edge folders operating in conjunction with said clamps to form reversely turned hooks or edge folds on the opposite ends of the blank by the downward and upward rocking movement of said edge folders or hook formers, an expansible and collapsible body former horn having a bodily reciprocating movement to permit the blank to be conveyed under the horn and to clamp the blank at its middle portion, a pair of wings or folders for bending or forming the blank into a can body around the horn, a reciprocating bumper for closing the seam against the horn, a stationary anvil or support beneath the horn to resist the blow or thrust of the bumper, a reciprocating wedge for expanding the wings or segments of the collapsible and expansible horn, and a wedge finger or cam carried by the bumper for operating said horn expanding wedge, substantially as specified.

4. In a can body making machine, the combination with two pair of can body blank holding clamps, one clamp of each pair being provided with an edge folding or hook forming lip, a pair of rocking hook formers or edge folders operating in conjunction with said clamps to form reversely turned hooks or edge folds on the opposite ends of the blank by the downward and upward rocking movement of said edge folders or hook formers, an expansible and collapsible body former horn having a bodily reciprocating movement to permit the blank to be conveyed under the horn and to clamp the blank at its middle portion, a pair of wings or folders for bending or forming the blank into a can body around the horn, a reciprocating bumper for closing the seam against the horn, a stationary rigid anvil or support beneath the horn to resist the blow or thrust of the bumper, a reciprocating wedge for expanding the wings or segments of the collapsible and expansible horn, and a wedge finger or cam carried by the bumper for operating said horn expanding wedge, substantially as specified.

5. In a can body making machine, the combination with two pair of can body blank holding clamps, one clamp of each pair being provided with an edge folding or hook forming lip, a pair of opposing clamping devices for the middle portion of the blank a pair of rocking hook formers or edge folders operating in conjunction with said clamps to form reversely turned hooks or edge folds on the opposite ends of the blank by the downward and upward rocking movement of said edge folders or hook formers, each rocking edge folder or hook former partially forming the hook by its rocking movement in one direction and completing it by its rocking movement in the return or opposite direction, and an expansible body former horn, said rocking hook formers coöperating with said expansible body former horn to produce the cam bodies of uniform size, substantially as specified.

6. In a can body making machine, the combination with two pair of can body blank holding clamps, one clamp of each pair being provided with an edge folding or hook forming lip, a pair of opposing clamping devices for the middle portion of the blank a pair of rocking hook formers or edge folders operating in conjunction with said clamps to form reversely turned hooks or edge folds on the opposite ends of the blank by the downward and upward rocking movement of said edge folders or hook formers, each rocking edge folder or hook former partially forming the hook by its rocking movement in one direction and completing it by its rocking movement in the return or opposite direction an expansible body former horn, a reciprocating wedge for expanding the wings or segments of the horn, a bumper and a finger carried by the bumper for operating the horn expanding wedge, said rocking hook formers coöperating with said expansible body former horn to produce the can bodies of uniform size, substantially as specified.

7. In a can body making machine, the combination with two pair of can body blank holding clamps, one clamp of each pair being provided with an edge folding or hook forming lip, a pair of opposing clamping devices for the middle portion of the blank a pair of rocking hook formers or edge folders operating in conjunction with said clamps to form reversely turned hooks or edge folds on the opposite ends of the blank by the downward and upward rocking movement of said edge folders or hook formers, each rocking edge folder or hook former partially forming the hook by its rocking movement in one direction and completing it by its rocking movement in the return or opposite direction an expansible body former horn, a reciprocating wedge for expanding the wings or segments of the horn, a bumper, a finger carried by the bumper for operating the horn expanding-wedge, and an anvil or support beneath the horn to resist the thrust of the bumper, said rocking hook formers coöperating with said expansible body former horn to produce the can bodies of uniform size, substantially as specified.

8. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction means for holding the middle portion of the blank in a straight line with and between said pairs of clamps during the hook forming operation, an expansible body former horn, of a reciprocating pin for expanding the segments of the horn, a bumper and a finger connected to the bumper for operating the horn expanding pin, said rocking hook formers coöperating with said expansible body former horn to produce the can bodies of uniform size, substantially as specified.

9. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction means for holding the middle portion of the blank in a straight line with and between said pairs of clamps during the hook forming operation, an expansible body former horn, of a reciprocating wedge for expanding the segments of the horn, a bumper and a finger connected to the bumper for operating the horn expanding wedge, said rocking hook formers coöperating with said expansible body former horn to produce the can bodies of uniform size, substantially as specified.

10. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction, means for holding the middle portion of the blank in a straight line with and between said pairs of clamps during the hook forming operation, an expansible can body former horn, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder and a conveyer for moving the can bodies along the soldering horn and discharging the same from the machine, said rocking hook formers coöperating with said expansible body former horn to produce the can bodies of uniform size, substantially as specified.

11. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction, means for holding the middle portion of the blank in a straight line with and between said pairs of clamps during the hook forming operation, an expansible can body former horn, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine and a wiper for removing surplus solder from the outside of the can body, said rocking hook formers coöperating with said expansible body former horn to produce the can bodies of uniform size, substantially as specified.

12. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction, means for holding the middle portion of the blank in a straight line with and between said pairs of clamps during the hook forming operation, an expansible can body former horn, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, a wiper for removing surplus solder from the outside of the can body, and a cooling device to cause the solder to quickly set, said rocking hook formers coöperating with said expansible body former horn to produce the can bodies of uniform size, substantially as specified.

13. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction, means for holding the middle portion of the blank in a straight line with and between said pairs of clamps during the hook forming operation an expansible can body former horn, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder and a conveyer for moving the can bodies along the soldering horn and discharging the same from the machine, a wiper for removing surplus solder from the outside of the can body, a cooling device to cause the solder to quickly set, and a rotary support for the outer end of the soldering horn, said rocking hook formers coöperating with said expansible body former horn to produce the can bodies of uniform size, substantially as specified.

14. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction, means for holding the middle portion of the blank in a straight line with and between said pairs of clamps during the hook forming operation an expansible can body former horn, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, and a cooling device to cause the solder to quickly set, said rocking hook formers coöperating with said expansible body former horn to produce the can bodies of uniform size, substantially as specified.

15. In a can body making machine, the combination with two pair of can body blank holding clamps, one clamp of each pair being provided with an edge folding lip, a pair of rocking hook formers each operating in conjunction with a pair of said clamps to partially form a hook or edge fold by its rocking movement in one direction and to complete it by its rocking movement in the opposite direction, means for holding the middle portion of the blank in a straight line with and between said pairs of clamps, an expansible body former horn, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, a cooling device to cause the solder to quickly set, and a rotary support for the outer ends of the soldering horn, said rocking hook formers coöperating with said expansible body former horn to produce the can bodies of uniform size, substantially as specified.

16. In a can body making machine, the combination with a can body blank feeder for automatically feeding the blanks one by one from a stack or pile, of a reciprocating can body blank conveyer furnished with pawls for feeding the blanks forward first to the edge folding mechanism and then to the body former horn, and with pawls for extracting the formed can body from said horn, two pair of can body blank holding clamps, one clamp of each pair being provided with an edge folding or hook forming lip, a pair of rocking hook formers or edge folders operating in conjunction with said clamps to form reversely turned hooks or edge folds on the opposite ends of the blank by the downward and upward rocking movement of said edge folders or hook formers, an expansible and collapsible body former horn having a bodily reciprocating movement to permit the blank to be conveyed under the horn and to clamp the blank at its middle portion, a pair of wings or folders for bending or forming the blank into a can body around the horn, a reciprocating bumper for closing the seam against the horn, a stationary rigid anvil or support beneath the horn to resist the blow or thrust of the bumper, a reciprocating wedge for expanding the wings or segments of the collapsible and expansible horn, a wedge finger or cam carried by the bumper for operating said horn expanding wedge, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, substantially as specified.

17. In a can body making machine, the combination with a can body blank feeder for automatically feeding the blanks one by one from a stack or pile, of a reciprocating can body blank conveyer furnished with pawls for feeding the blanks forward first to the edge folding mechanism and then to the body former horn, and with pawls for extracting the formed can body from said horn, two pair of can body blank holding clamps, one clamp of each pair being provided with an edge folding or hook forming lip, a pair of rocking hook formers or edge folders operating in conjunction with said clamps to form reversely turned hooks or edge folds on the opposite ends of the blank by the downward and upward rocking movement of said edge folders or hook formers, an expansible and collapsible body former horn having a bodily reciprocating movement to permit the blank to be conveyed under the horn and to clamp the blank at its middle portion, a pair of wings or folders for bending or forming the blank into a can body around the horn, a reciprocating bumper for closing the seam against the horn, a stationary rigid anvil or support beneath the horn to resist the blow or thrust of the bumper, a reciprocating wedge for expanding the wings or segments of the collapsible and expansible horn, a wedge finger or cam carried by the bumper for operating said horn expanding wedge, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, and a rotary support for the outer end of the soldering horn, substantially as specified.

18. In a can body making machine, the combination with a can body blank feeder for automatically feeding the blanks one by one from a stack or pile, of a reciprocating can body blank conveyer furnished with pawls for feeding the blanks forward first to the edge folding mechanism and then to the body former horn, and with pawls for extracting the formed can body from said horn, two pair of can body blank holding clamps, one clamp of each pair being provided with an edge folding or hook forming lip, a pair of rocking hook formers or edge folders operating in conjunction with said clamps to form reversely turned hooks or edge folds on the opposite ends of the blank by the downward and upward rocking movement of said edge folders or hook formers, an expansible and collapsible body former horn having a bodily reciprocating movement to permit the blank to be conveyed under the horn and to clamp the blank at its middle portion, a pair of wings or folders for bending or forming the blank into a can body around the horn, a reciprocating bumper for closing the seam against the horn, a stationary rigid anvil or support beneath the horn to resist the blow or thrust of the bumper, a reciprocating wedge for expanding the wings or segments of the collapsible and expansible horn, a wedge finger or cam carried by the bumper for operating said horn expanding wedge, a soldering horn connected to the end of the body former horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, a conveyer for moving the can bodies along the soldering horn and discharging the same from the machine, a rotary support for the outer ends of the soldering horn, and mechanism for operating or imparting to the several coöperative moving parts or devices of the machine their required movements, substantially as specified.

19. In a can body making machine, the combination with a can body blank conveyer, of two pair of blank holding clamps, one clamp of each pair having a hook forming lip thereon, a pair of opposing clamping devices for the middle portion of the blank, two rocking hook formers, each rocking edge folder or hook former partially forming the hook by its rocking movement in one direction and completing it by its rocking movement in the return or opposite direction, an expansible body former horn having movable wings or segments, two body forming wings or folders, a bumper and a finger carried by the bumper for operating the movable wings or segments of said horn, said rocking hook formers coöperating with said expansible body former horn to produce the can bodies of uniform size, substantially as specified.

20. In a can body making machine, the combination with a can body blank conveyer, of two pair of blank holding clamps, one clamp of each pair having a hook forming lip thereon, a pair of opposing clamping devices for the middle portion of the blank, two rocking hook formers, each rocking edge folder or hook former partially forming the hook by its rocking movement in one direction and completing it by its rocking movement in the return or opposite direction, an expansible body former horn having movable wings or segments, two body forming wings or folders, a bumper and a finger carried by the bumper for operating the movable wings or segments of said horn, and an anvil or support beneath the horn, said rocking hook formers coöperating with said expansible body former horn to produce the can bodies of uniform size, substantially as specified.

21. In a can body making machine, the combination with a can body blank conveyer, of two pair of blank holding clamps, one clamp of each pair having a hook forming lip thereon, a pair of opposing clamping devices for the middle portion of the blank, two rocking hook formers, each rocking edge folder or hook former partially forming the hook by its rocking movement in one direction and completing it by its rocking movement in the return or opposite direction, an expansible body former horn having movable wings or segments, two body forming wings or folders, a bumper and a finger carried by the bumper for operating the movable wings or segments of said horn, an anvil or support beneath the horn, and means for moving the horn up and down, said rocking hook formers coöperating with said expansible body former horn to produce the can bodies of uniform size, substantially as specified.

22. In a can body making machine, the combination with a can body blank conveyer, of two pair of blank holding clamps, one clamp of each pair having a hook forming lip thereon, two rocking hook formers, an expansible body former horn having movable wings or segments, two body forming wings or folders, a bumper and a finger carried by the bumper for operating the movable wings or segments of said horn, a flux or acid applying device for fluxing the seam, a soldering iron above the soldering horn coöperating therewith to solder the side seam of the can body as it is moving along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, and a conveyer for moving the can bodies along the soldering horn and discharging the same from the machine, substantially as specified.

23. In a can body making machine, the combination with a can body blank conveyer, of two pair of blank holding clamps, one clamp of each pair having a hook forming lip thereon, two rocking hook formers, an expansible body former horn having movable wings or segments, two body forming wings or folders, a bumper and a finger carried by the bumper for operating the movable wings or segments of said horn, an anvil or support beneath the horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, and a conveyer for moving the can bodies along the soldering horn and discharging the same from the machine, substantially as specified.

24. In a can body making machine, the combination with a can body blank conveyer, of two pair of blank holding clamps, one clamp of each pair having a hook forming lip thereon, two rocking hook formers, an expansible body former horn having movable wings or segments, two body forming wings or folders, a bumper and a finger carried by the bumper for operating the movable wings or segments of said horn, an anvil or support beneath the horn, means for moving the horn up and down, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, and a conveyer for moving the can bodies along the soldering horn and discharging the same from the machine, substantially as specified.

25. In a can body making machine, the combination with a can body blank feeder, of a can body blank conveyer, two pair of blank holding clamps, one clamp of each pair having a hook forming lip thereon, two rocking hook formers, an expansible body former horn having movable wings or segments, two body forming wings or folders, a bumper and a finger carried by the bumper for operating the movable wings or segments of said horn, substantially as specified.

26. In a can body making machine, the combination with a can body blank feeder, of a can body blank conveyer, two pair of blank holding clamps, one clamp of each pair having a hook forming lip thereon, a pair of opposing clamping devices for the middle portion of the blank two rocking hook formers, each rocking edge folder or hook former partially forming the hook by its rocking movement in one direction and completing it by its rocking movement in the return or opposite direction, an expansible body former horn having movable wings or segments, two body forming wings or folders, a bumper and a finger carried by the bumper for operating the movable wings or segments of said horn, and an anvil or support beneath the horn said rocking hook formers coöperating with said expansible body former horn to produce the can bodies of uniform size.

27. In a can body making machine, the combination with a can body blank feeder, of a can body blank conveyer, two pair of blank holding clamps, one clamp of each pair having a hook forming lip thereon, two rocking hook formers, an expansible body former horn having movable wings or segments, two body forming wings or folders, a bumper, a finger carried by the bumper for operating the movable wings or segments of said horn, an anvil or support beneath the horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, and a conveyer for moving the can bodies along the soldering horn and discharging the same from the machine, substantially as specified.

28. In a can body making machine, the combination with a can body blank feeder, of a can body blank conveyer, two pair of blank holding clamps, one clamp of each pair having a hook forming lip thereon, two rocking hook formers, an expansible body former horn having movable wings or segments, two body forming wings or folders, a bumper, a finger carried by the bumper for operating the movable wings or segments of said horn, a flux or acid applying device for fluxing the seam, a soldering iron above the soldering horn coöperating therewith to solder the side seam of the can body as it is moved along between the soldering iron and the soldering horn, a wire solder feed device, a trip mechanism for controlling the operation of the wire solder feed device from and by the can body as it is moved along the soldering horn to cause the solder to be fed only when a can body is present to receive the solder, and a conveyer for moving the can bodies along the soldering horn and discharging the same from the machine, substantially as specified.

29. In a can body making machine, the combination with two pair of can body blank holding clamps, one clamp of each pair being provided with an edge folding lip, means for holding the middle portion of the blank in line between said pairs of clamps, a pair of rocking edge folders operating in conjunction with said clamps to form reversely turned edge folds on the opposite ends of the blank by the downward and upward rocking movements of said edge folders, each rocking edge folder partially forming the edge fold by its rocking movement in one direction and completing it by its rocking movement in the other direction, an expansible body former horn, means for wrapping the blank around the horn, said rocking edge folders coöperating with said expansible body former horn to produce the can bodies of uniform size, substantially as specified.

30. In a can body making machine, the combination with two pair of can body blank holding clamps, one clamp of each pair being provided with an edge folding lip, a pair of rocking edge folders operating in conjunction with said clamps to form reversely turned edge folds on the opposite ends of the blank by the downward and upward rocking movements of said edge folders, each rocking edge folder partially forming the edge fold by its rocking movement in one direction and completing it by its rocking movement in the opposite direction, an expansible body former horn, means for wrapping the blank around the horn, said rocking edge folders coöperating with said expansible body former horn to produce the can bodies of uniform size, substantially as specified.

FRANK RUDOLPHI.

Witnesses:
H. M. MUNDAY,
EDMUND ADCOCK.